United States Patent [19]
Wirges

[11] Patent Number: 5,382,833
[45] Date of Patent: Jan. 17, 1995

[54] CURRENT GENERATOR WITH CORE COOLING

[75] Inventor: Gerhard O. Wirges, Hamburg, Germany

[73] Assignees: Kaethe Hagemeier, Moormerland-Neermoor; Chandrakanthi Wirges, Hamburg, both of Germany

[21] Appl. No.: 108,729

[22] PCT Filed: Feb. 27, 1992

[86] PCT No.: PCT/EP92/00412

§ 371 Date: Sep. 1, 1993

§ 102(e) Date: Sep. 1, 1993

[30] Foreign Application Priority Data

Mar. 1, 1991 [DE] Germany .................. 4106497

[51] Int. Cl.6 .......................... F01P 5/10; H02K 9/19; H02K 7/18
[52] U.S. Cl. .................. 290/1 A; 123/41.44; 123/41.47; 290/1 R; 417/420
[58] Field of Search .......... 123/41.44, 41.47; 290/1 R, 1 A; 417/420

[56] References Cited

U.S. PATENT DOCUMENTS

| 3,723,029 | 3/1973 | Laing | 417/420 |
| 4,643,135 | 2/1987 | Wünsche | 123/41.44 |
| 4,645,432 | 2/1987 | Tata | 417/420 |

FOREIGN PATENT DOCUMENTS 1905112 4/1964 Germany .
8703950 8/1987 Germany .

Primary Examiner—A. D. Pellinen
Assistant Examiner—Robert Lloyd Hoover
Attorney, Agent, or Firm—Michael J. Striker

[57] ABSTRACT

A current generator, particularly for vehicles, has a shaft, a liquid cooled generator, a liquid cooled internal combustion engine forming a drive motor for the generator, and a pump for supplying a liquid coolant. The generator, the internal combustion engine and the pump are arranged coaxially on the shaft. The pump for a liquid coolant is located on the shaft between the generator and the drive motor.

5 Claims, 2 Drawing Sheets

CURRENT GENERATOR WITH CORE COOLING

BACKGROUND OF THE INVENTION

The present invention relates to a current generator, in particular for motor vehicles, which is composed of a liquid cooled generator and a liquid cooled internal combustion engine formed as a drive motor as well as a pump for the liquid coolant, which are arranged coaxially on a shaft.

Such a current generator is disclosed, for example, in the German patent document G 86 01 003. The water pump which is required for the cooling is arranged outside of the motor so that it is easily accessible for maintenance.

An air cooled current generator is disclosed in the U.S. Pat. No. 4,827,147. Current generators of this type have the advantage that the blower wheel does not need any maintenance. However, there are some disadvantages. In order to avoid two separate blower wheels, a single, double acting blower wheel is arranged between the motor and the generator. Fresh air is aspirated in two partial streams separately through the motor and through the generator and then jointly expelled. Thereby, the action of two separate blowers is obtained with one blower wheel.

Furthermore, the U.S. Pat. No. 4,486,668 describes a generator with a vacuum pump which is arranged between a driving V-belt pulley and the generator. The pump is easily accessible due to the belt drive. A coaxial arrangement of the motor and generator shaft is thereby avoided. The generator is not cooled with liquid. The pump does not operate for cooling.

The German document DE 35 34 507 A1 describes exclusively an internal combustion engine with a cooling water pump which has a magnet rotor. The pump is also easily accessible.

The known current generators have the same disadvantage that the armature shaft bearings or drive motor shaft bearings fail especially in narrow space conditions, which affects the operational safety.

SUMMARY OF THE INVENTION

Accordingly, it is an object of the present invention to provide a current generator which avoids the disadvantages of the prior art.

In keeping with these objects and with others which will become apparent hereinafter, one feature of the present invention resides, briefly stated, in a current generator, particularly for motor vehicles, which has a liquid cooled generator and a liquid cooled internal combustion engine formed as a drive motor and also a pump for a liquid coolant arranged coaxially on a shaft, wherein the pump for the liquid coolant is located on the shaft between the generator and the drive motor.

It is provided that the coolant pump is arranged between the generator and the drive motor. As a result of this step, the cooling acts on both these units. The arrangement saves space and results in an advantageously high temperature gradient with respect to the cooler portion of the shaft on which the coolant pump is arranged.

Accordingly, the heat generated at the armature of the current generator is guided off via the generator shaft and the heat from the crankshaft of the drive motor is guided directly to the heat sink, the coolant pump. Thermal failure of the shaft bearings is accordingly prevented. The life of the units is lengthened accordingly. The cooling of the generator according to the invention makes it possible to dispense with air cooling of the current generator. This advantageously reduces the dimensions of the current generator.

Since the coolant pump is arranged on the shaft, V-belts for external coolant pumps can be omitted in the current generator according to the invention. The risk of injury due to rotating parts arranged on the current generator is decreased as a result.

It is further provided that the shaft includes a generator shaft, pump shaft, and drive-motor shaft which are connected with one another so as to be aligned. The cooling device is accordingly easy to separate from the generator and drive motor. Maintenance is also simplified. In a modular-type construction, the current generator can be assembled piecewise depending on its intended use and circumstantial factors so that costs for stocking parts and delivery times are advantageously reduced. In spite of the modular assembly of the generator, the heat generated in the armature of the generator is guided off by the armature shaft via thermal contact with the pump shaft over a large surface area.

Since the connection between the armature shaft and pump shaft is constructed as a self-centering conical snug fit, the pump shaft is aligned with the armature shaft so as to be self-centering. Misalignment and resulting high bearing wear are accordingly prevented.

In a development of the invention the coolant pump is constructed as a magnetic impeller pump. The current generator is accordingly particularly easy to service, since rotating sealing surfaces or seals are entirely dispensed with. In addition, the space requirement is further reduced, since a magnetic impeller pump has small dimensions in the axial direction.

The coolant is delivered in the simplest possible manner in that the magnetic impeller pump has a blade impeller constructed as a magnetic impeller and a stationary pump housing with coolant suction line and coolant pressure line connected thereto. The coolant suction line and coolant delivery line are preferably attached to the outer surface of the housing in the radial direction. Accordingly, the line connection does not require any additional space in the axial direction. Further, the coolant line connections are easily accessible for maintenance purposes.

By arranging a sliding bush between the pump housing and the shaft to direct heat from the shaft into the pump housing, the heat generated in the generator and drive motor and released on the shaft is transmitted in a particularly efficient manner to the stationary pump housing by heat conduction. The transmission of heat to the pump housing is increased by the relatively high temperature gradients between the shaft and coolant. A thermal lubricant is advantageously introduced between the sliding bush and shaft for a further improvement in the heat conduction.

In another development of the invention the coolant pump is a centrifugal pump, in particular a self-priming centrifugal pump. This type of pump is especially robust and is also impervious to dry running.

In another construction of the invention the coolant pump has a stationary pump housing with coolant suction line and coolant delivery line and a blade impeller connected with the pump shaft so as to be fixed with respect to rotation relative to it. The coolant suction line is guided into the pump housing as far as the radial inner region of the blade impeller in a plane situated vertically relative to the pump shaft. The coolant suction line is accordingly arranged in the pump housing in a radial to tangential direction and leads up to the inner diameter of the blade impeller. The coolant is accelerated outward centrifugally from there by the rotating blade impeller and is guided out via the coolant delivery line in the outer area of the housing. The coolant pump can accordingly be arranged between the drive motor and generator so as to economize on space in an advantageous manner without the shaft being lengthened so as to cause thermal disadvantages and technical problems related to the bearings in the case of suction lines which are conventionally guided axially in centrifugal pumps.

The pump can be produced cheaply in that the pump housing is composed of a central pump part and two preferably identical pump covers. In particular, fewer replacement parts must be stocked in that the coolant suction line and coolant delivery line are arranged in the central pump part.

The central pump part is preferably made of high-quality steel and the pump covers are made of polyamide. This makes for a lower weight of the pump housing and also improves the thermal insulation, in which the heat transmitted from the pump shaft to the coolant is efficiently guided off from the generator area. The high-grade steel pump housing requires practically no maintenance.

As a result of the aforementioned advantages the current generator has smaller dimensions and a higher output coefficient.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF PREFERRED EMBODIMENTS

Figure 1:
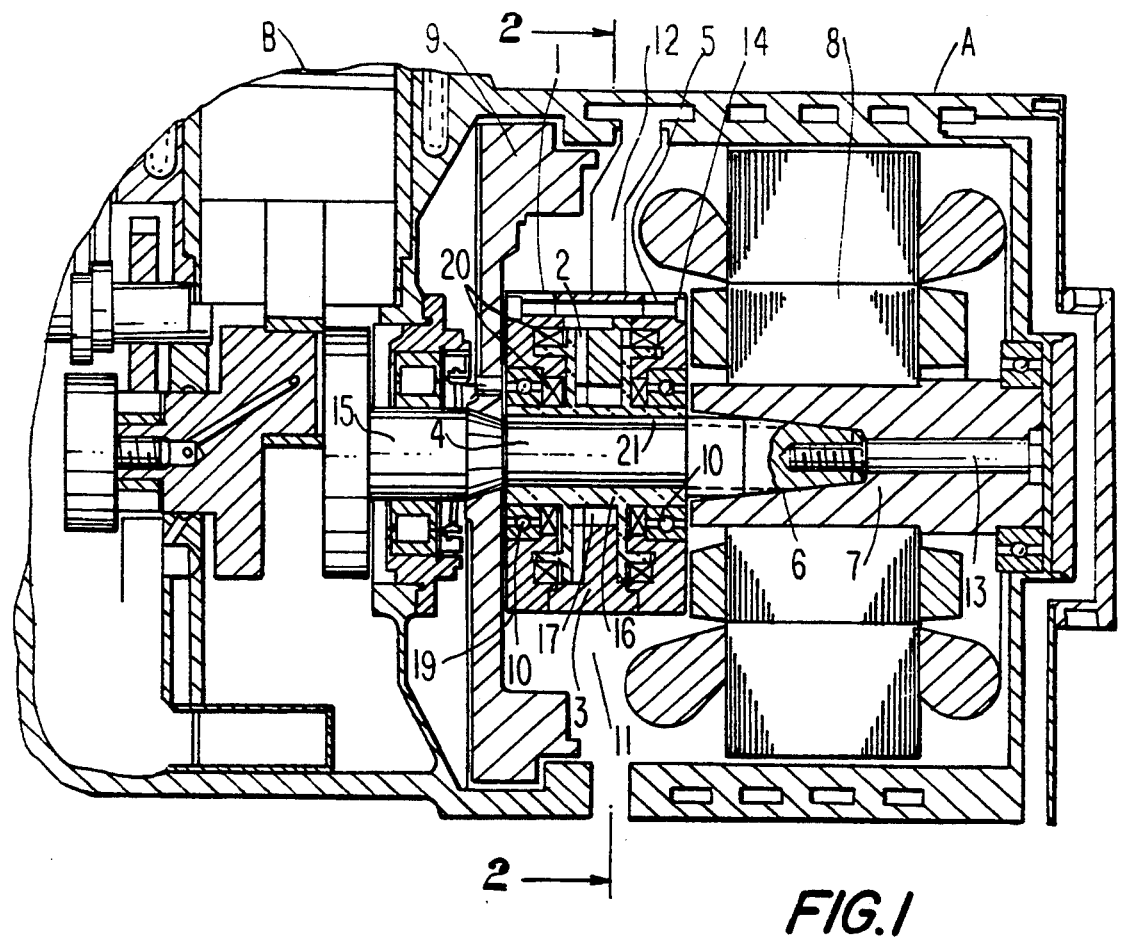
FIG. 1 shows a longitudinal section of a current generator with drive motor and generator and with a centrifugal pump arranged between the latter.

FIG. 1 shows a current generator which has a drive motor B and a generator A. A centrifugal pump 1 is arranged on a common shaft (4, 7, 15) between the generator armature 8 of the generator A and the centrifugal mass 9 of the drive motor B.

The shaft (4, 7, 15) is divided into three portions: a generator shaft 7, a pump shaft 4, and a drive-motor shaft 15. The generator shaft 7 and the pump shaft 4 are connected via a conical snug fit 6 which is tensioned with a screw 13 arranged in the axial line of the armature shaft 7. The shaft portions which are securely connected in this way are thereby aligned in an exact manner and thermally coupled with one another via the surface of the conical snug fit 6.

A blade impeller 2 is attached to the pump shaft 4 by a tongue-and-groove connection 21 so as to be fixed with respect to rotation relative to it. The blade impeller 2 is formed on at a cylindrical sleeve 16 which extends roughly over the width of the centrifugal pump 1 and has thermal contact with the pump shaft 4 over a large surface area. Bearings 10 which rotatably support a stationary pump housing (5, 3, 5) on the pump shaft 4 are arranged on the outside of the cylindrical sleeve 16.

The stationary pump housing (5, 3, 5) of the centrifugal pump 1 has a central pump part 3 made of high-quality steel and two identical pump covers 5 made of polyamide which are arranged at the front of the central pump part 3. These three structural component parts are screwed together by screws 14 and, together with the blade impeller 2, form the centrifugal pump 1.

The coolant is fed to the interior 17 of the centrifugal pump 1 via a coolant suction line 11 arranged radially in the central pump part 3. The coolant is accelerated by the rotational movement of the blade impeller 2 and guided into an outer annular sector 18 of the centrifugal pump 1 and from there is guided outward via a short coolant delivery line 12 arranged radially in the central pump part 3.

The centrifugal pump 1 is sealed with sealing rings 20 between the pump covers 5 and the blade impeller 2 in two radial areas at the cylindrical sleeve 16 on one side and at an outer sealing surface 19 on the other side.

Figure 2:
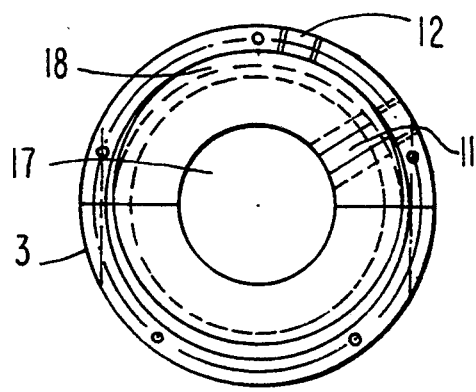
FIG. 2 shows a cross section of a central pump part of the centrifugal pump along line 2—2 in FIG. 1.

FIG. 2 shows that the central pump part 3 is constructed so as to be divided in the radial direction for mounting the centrifugal pump 1. The two halves of the central pump part 3 can be connected via tangentially arranged screws.

Figure 3:
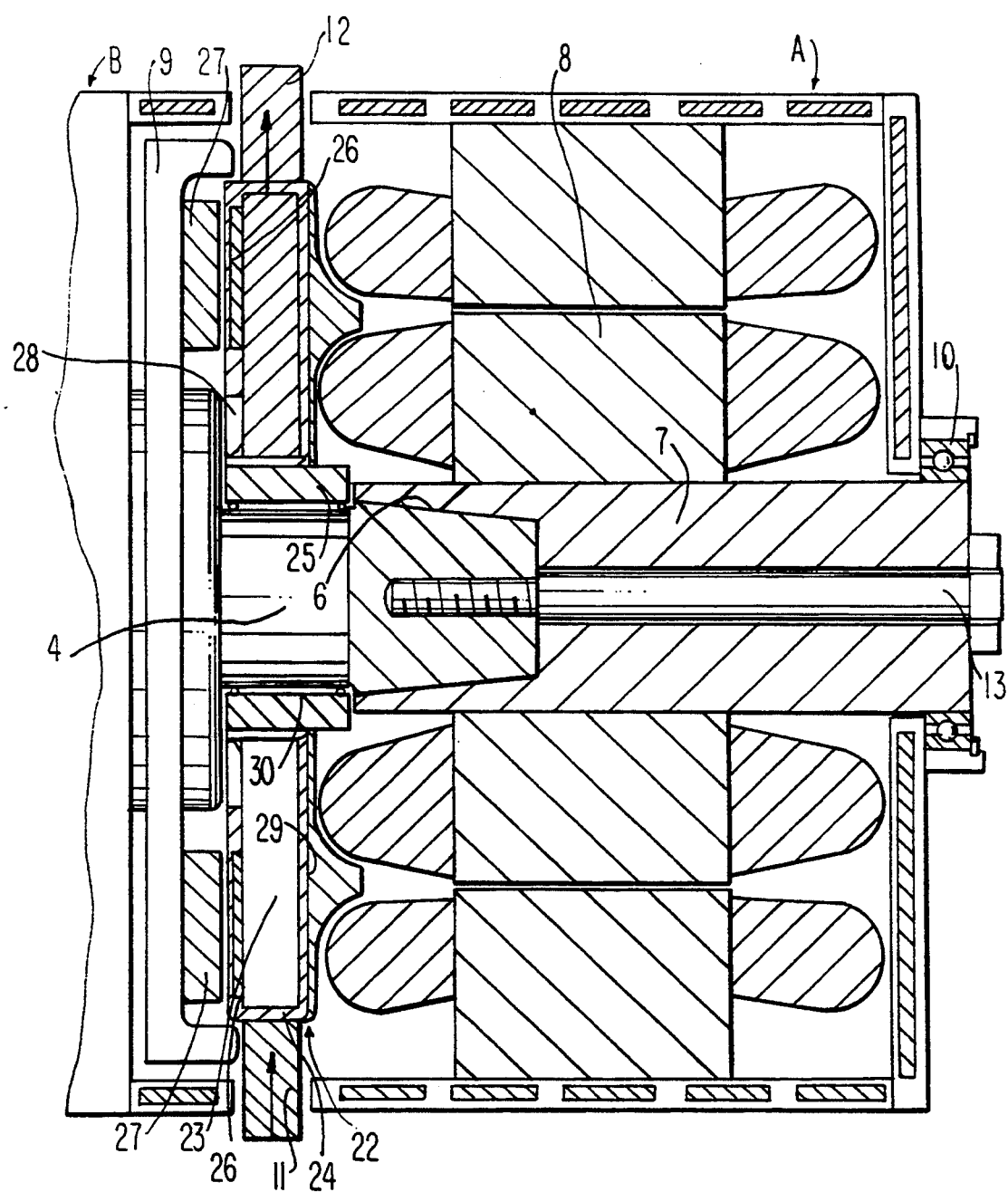
FIG. 3 shows a schematic longitudinal section of a current generator with drive motor and generator and with a magnetic impeller pump arranged between them.

FIG. 3 shows an embodiment example with a coolant pump which is constructed as a magnetic impeller pump 22 and is likewise arranged between the drive motor B and generator A. The magnetic impeller pump 22 has a pump housing 24 and a blade impeller 23 which is arranged therein so as to be rotatable. The blade impeller 23 is outfitted with a permanent magnet 26 which is integral with an annular surface. Located opposite this permanent magnet 26 are permanent magnets 27 on a structural component part, e.g. a centrifugal mass 9, driven by the drive motor. The blade impeller 23 of the magnetic impeller pump 22 is accordingly driven by the centrifugal mass 9 without contact. The magnetic impeller pump 22 works as a centrifugal pump.

The coolant suction line 11 leads into the pump housing 24. The coolant delivery line 12 is arranged opposite the latter.

A sliding bush 25 is arranged between the pump housing 24 and the pump shaft 4 to improve the heat conduction. The sliding bush 25, e.g. a commercially available cast-bronze bearing bush, contacts the pump shaft 4 on the inside so as to be rotatable and is securely connected at the outside with the pump housing 24. A heat-conducting lubricant 30 is preferably introduced in a suitable manner into the sliding surface between the sliding bush 25 and the pump shaft 4. This improves the heat conduction between the rotating pump shaft 4 and the stationary sliding bush 25 and reduces friction.

A spacer disk 28 which is preferably made from ceramic material is arranged between the appropriate abutment at the rotatable centrifugal mass 9 and the stationary pump housing 24 so as to improve the starting characteristics of the magnetic impeller pump.

Cooling ribs 29 are formed on the side of the pump housing 24 facing the generator A for improved cooling action. The flow of air generated by the rotating movement of the generator armature 8 is cooled at the cooling ribs 29. This further reduces the operating temperature of the generator A.

It will be understood that each of the elements described above, or two or more together, may also find a useful application in other types of constructions differing from the types described above.

While the invention has been illustrated and described as embodied in a current generator with core cooling, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

LIST OF REFERENCE NUMBERS

A generator
B drive motor
1 coolant pump (centrifugal pump)
2 blade impeller
3 central pump part
4 pump shaft
5 pump covers
6 conical snug fit
7 generator shaft
8 generator armature
9 centrifugal mass
10 bearing
11 coolant suction line
12 coolant delivery line
13 screw
14 screw
15 drive-motor shaft
16 cylindrical sleeve
17 interior
18 outer annular sector
19 outer sealing surface
20 sealing ring
21 tongue-and-groove connection
22 magnetic impeller pump
23 blade impeller
24 pump housing
25 sliding bush
26 permanent magnet
27 permanent magnet
28 spacer disk
29 cooling ribs
30 lubricant

What is claimed as new and desired to be protected by Letters Patent is set forth in the appended claims.

1. A current generator, particularly for vehicles, comprising a shaft; a liquid cooled generator; a liquid cooled internal combustion engine forming a drive motor for said generator; a pump for supplying a liquid coolant, said generator, said internal combustion engine and said pump being arranged coaxially on said shaft, said pump for a liquid coolant being located on said shaft between said generator and said drive motor, said pump for a liquid coolant being formed as a magnetic impeller pump, said magnetic impeller pump having a blade impeller which is formed as a magnetic impeller, and a stationary pump housing with a coolant suction line and a coolant delivery line; and a sliding bush for conducting heat from said shaft into said pump housing, said sliding bush being arranged between said pump housing and said shaft.

2. A current generator as defined in claim 1, wherein said shaft is subdivided into three shaft portions, including a generator shaft portion, a pump shaft portion and a drive motor shaft portion, said shaft portions being connected with one another so as to be aligned with each other.

3. A current generator as defined in claim 2; and further comprising means for connecting said generator shaft portion and said pump shaft portion and including a self-centering conical snug fit.

4. A current generator as defined in claim 2, wherein said pump for a liquid coolant is formed as a centrifugal pump.

5. A current generator as defined in claim 4, wherein said centrifugal pump is a self-priming centrifugal pump.

* * * * *